Nov. 11, 1952 J. ROBILLARD ET AL 2,617,153
MANUFACTURE OF SILICA MEMBRANES
Filed July 13, 1949

INVENTORS
Jean ROBILLARD and Claire PIERREE
By [signature]
Agent

Patented Nov. 11, 1952 2,617,153

UNITED STATES PATENT OFFICE 2,617,153

MANUFACTURE OF SILICA MEMBRANES

Jean Robillard and Claire Pierrée, Paris, France, assignors to Compagnie Generale de Telegraphie Sans Fil, a corporation of France Application July 13, 1949, Serial No. 104,574
In France July 16, 1948

2 Claims. (Cl. 18—57)

In several applications, for example certain measurements of radiation in the infra-red field, use is made as a receiver of thermoelectric piles, the various couples of which are obtained by vaporizing two metals on a very thin collodion membrane through suitably arranged diaphragms.

It is possible to increase the sensitivity of such a system by decreasing its calorific capacity, i. e. in practice by decreasing the thickness of the supporting membrane to the maximum extent consistent with the mechanical rigidity of the system. Said rigidity becomes insufficient when the thickness of the membrane is less than 0.4 micron.

Our invention has precisely for its object to provide an extremely thin membrane which is not fragile and which enables the sensitivity of the thermoelectric couple that it supports to be increased.

According to the invention, such a result is obtained by depositing the constituent metals of the thermoelectric couple on a thin film produced by vaporizing powdered silica in vacuo on a sheet of collodion which is subsequently dissolved. Tests show that for a smaller thickness the silica membranes are less fragile than the collodion films.

The accompanying drawing and the description relating thereto illustrate, by way of a nonlimitative example, one embodiment of a radiator for enabling silica powder to be vaporized in vacuo so as to deposit it, according to the invention, on a sheet of collodion.

Figure 1:
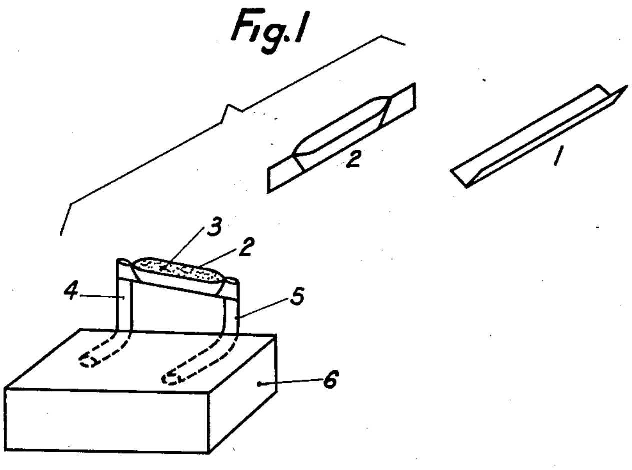
Fig. 1 shows the radiator.

The radiator essentially comprises, Fig. 1, a tantalum strip 1 which is bent into a V shape in the lengthwise direction and the ends of which are pinched together so as to form a cup 2. Said cup is welded to two molybdenum rods 4 and 5 which are rigidly fixed in a block of steatite 6. The silica powder 3 to be vaporized is placed in the cup 2.

Heating is obtained by Joule effect by passing a current of about 20 amperes through the radiator. The tantalum is thus raised to a temperature of about 2000° C., almost to the subliming temperature of silica.

Figure 2:
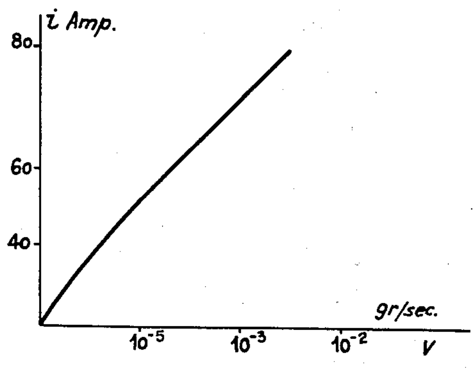
Fig. 2 shows the characteristic curve of the operation thereof.

Fig. 2 shows the characteristic curve of the operation of such a system. The current in amperes which passes through the radiator is plotted as ordinates, and the speed of vaporization of the silica in grammes per second as abscissae.

It is advisable to arrange a diaphragm above the radiator, in the vacuum chamber in which the vaporization of the silica is effected, the purpose of said diaphragm being to stop the metallic atoms which might be emitted by the members near the useful portion.

It is possible to obtain by means of the above described method supporting films, the thickness of which may be 500 Angstrom units for an area of three square centimetres and which are still of satisfactory strength. The sensitivity of a thermoelectric couple constructed with such a support is thus considerably increased.

What we claim is:

1. A method of manufacturing very thin silica films suitable as supports for thermoelectric couples comprising the steps of vaporizing a silica powder in vacuo, condensing the silica vapors thus obtained on a collodion sheet to form a layer not exceeding a thickness of 0.4 micron, and dissolving said collodion sheet so as to obtain a self-sustaining silica film of said thickness.

2. A method of manufacturing very thin silica films suitable as supports for thermoelectric couples comprising the steps of placing silica powder on a tantalum support, heating the support in vacuo by means of an electric current so as to vaporize the silica, condensing the silica vapor on a collodion sheet to form a layer not exceeding a thickness of 0.4 micron, and dissolving said collodion sheet, so as to obtain a self-sustaining silica film of said thickness.

JEAN ROBILLARD.
CLAIRE PIERRÉE.

REFERENCES CITED

The following references are of record in the file of this patent:

UNITED STATES PATENTS

| Number | Name | Date |
|---|---|---|
| 976,994 | Fichtmueller | Nov. 29, 1910 |
| 1,306,568 | Weintraub | June 10, 1919 |
| 2,289,152 | Telkes | July 7, 1942 |
| 2,360,479 | Detrick et al. | Oct. 17, 1944 |
| 2,382,432 | McManus et al. | Aug. 14, 1945 |
| 2,438,892 | Becker | Apr. 6, 1948 |